（12） United States Patent
Kuroda et al.

(10) Patent No.: US 12,555,829 B2
(45) Date of Patent: Feb. 17, 2026

(54) STORAGE BATTERY APPARATUS

(71) Applicant: KABUSHIKI KAISHA TOSHIBA, Tokyo (JP)

(72) Inventors: Kazuto Kuroda, Tokyo (JP); Yusuke Kikuchi, Kawasaki (JP); Kota Asami, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 698 days.

(21) Appl. No.: 17/654,896

(22) Filed: Mar. 15, 2022

(65) Prior Publication Data

US 2022/0209309 A1 Jun. 30, 2022

Related U.S. Application Data

(63) Continuation of application No. PCT/JP2019/036398, filed on Sep. 17, 2019.

(51) Int. Cl.
H02J 7/00 (2006.01)
H01M 10/42 (2006.01)
H01Q 1/24 (2006.01)

(52) U.S. Cl.
CPC ............ *H01M 10/425* (2013.01); *H01Q 1/24* (2013.01); *H01M 2010/4278* (2013.01)

(58) Field of Classification Search
None
See application file for complete search history.

(56) References Cited

U.S. PATENT DOCUMENTS

| 2002/0024429 | A1* | 2/2002 | Kamlah | ............... B60R 25/246 340/426.1 |
| 2013/0271072 | A1* | 10/2013 | Lee | ................... H01M 10/4207 320/108 |
| 2015/0028816 | A1 | 1/2015 | Lee | |
| 2015/0236811 | A1 | 8/2015 | Akita et al. | |

(Continued)

FOREIGN PATENT DOCUMENTS

| EP | 3 633 646 A1 | 4/2020 |
| JP | 2015-154390 A | 8/2015 |

(Continued)

OTHER PUBLICATIONS

International Search Report issued Dec. 3, 2019 in PCT/JP2019/036398, filed on Sep. 17, 2019, 1 page.

(Continued)

*Primary Examiner* — Samuel Berhanu
(74) *Attorney, Agent, or Firm* — Maier & Maier, PLLC

(57) ABSTRACT

According to one embodiment, a storage battery apparatus including a wireless module transmitting and receiving a radio wave having a polarization plane in any one of first to third directions orthogonal to one another; and a battery management unit including a first wireless module transmitting and receiving a radio wave having the polarization plane in the first direction, and a second wireless module transmitting and receiving a radio wave having the polarization plane in the second direction, wherein the polarization plane in the first direction is less likely to have reception power of lowest receiving sensitivity than the polarization planes in other directions, and a number of the first wireless modules is larger than a number of the second wireless modules.

4 Claims, 9 Drawing Sheets

(56) References Cited

U.S. PATENT DOCUMENTS

2016/0056510 A1* 2/2016 Takeuchi ............ H01M 10/425
                                                    429/50
2018/0331581 A1* 11/2018 Hosseini ............... H02J 7/0042
2019/0242949 A1* 8/2019 Lemkin ................. H01M 10/42

FOREIGN PATENT DOCUMENTS

| JP | 2019-28822 A | 2/2019 |
| JP | 2019-61870 A | 4/2019 |
| JP | 2019-61872 A | 4/2019 |

OTHER PUBLICATIONS

Extended European Search Report dated Oct. 7, 2022, in European Application No. EP 19946114.6 (6 pages).

* cited by examiner

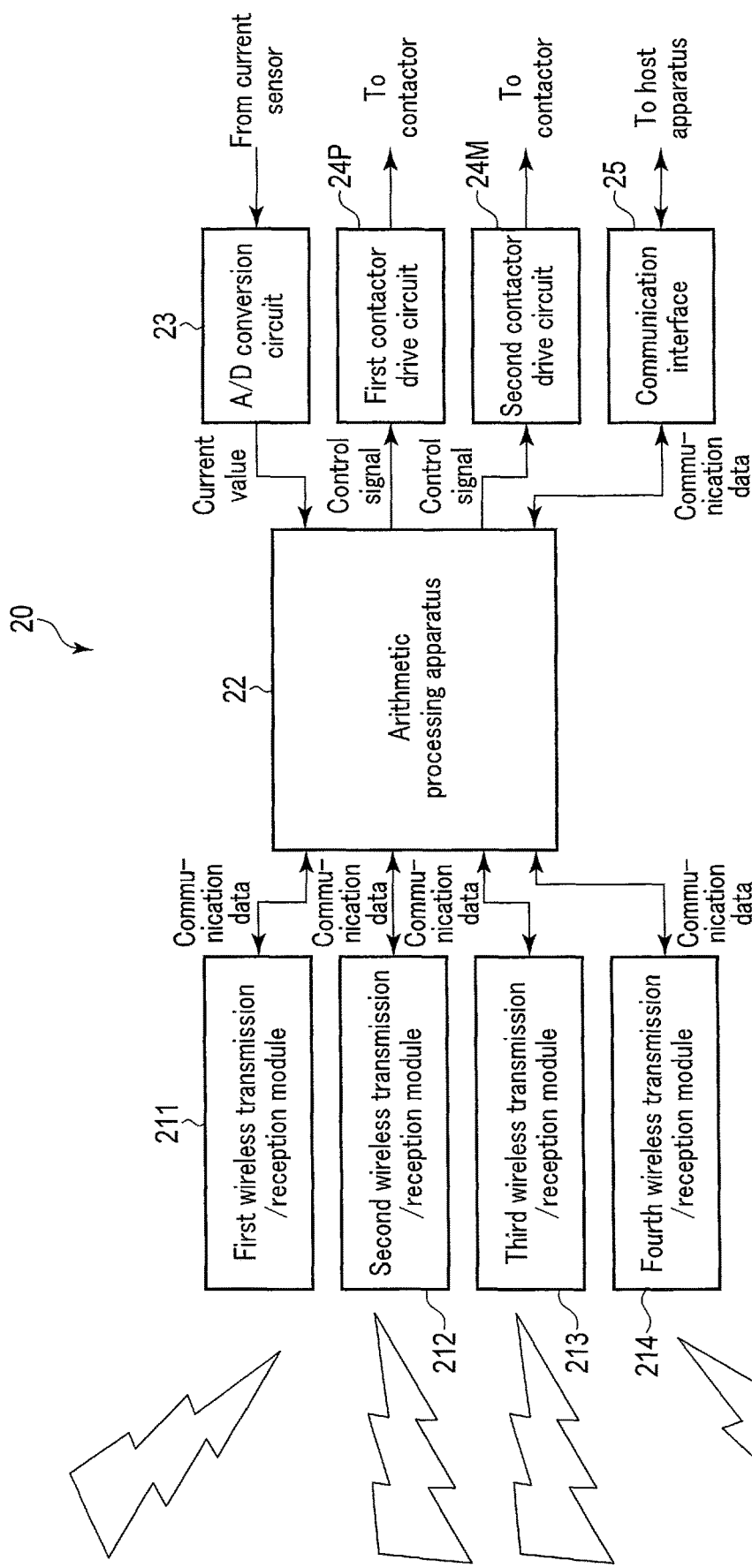
F I G. 3

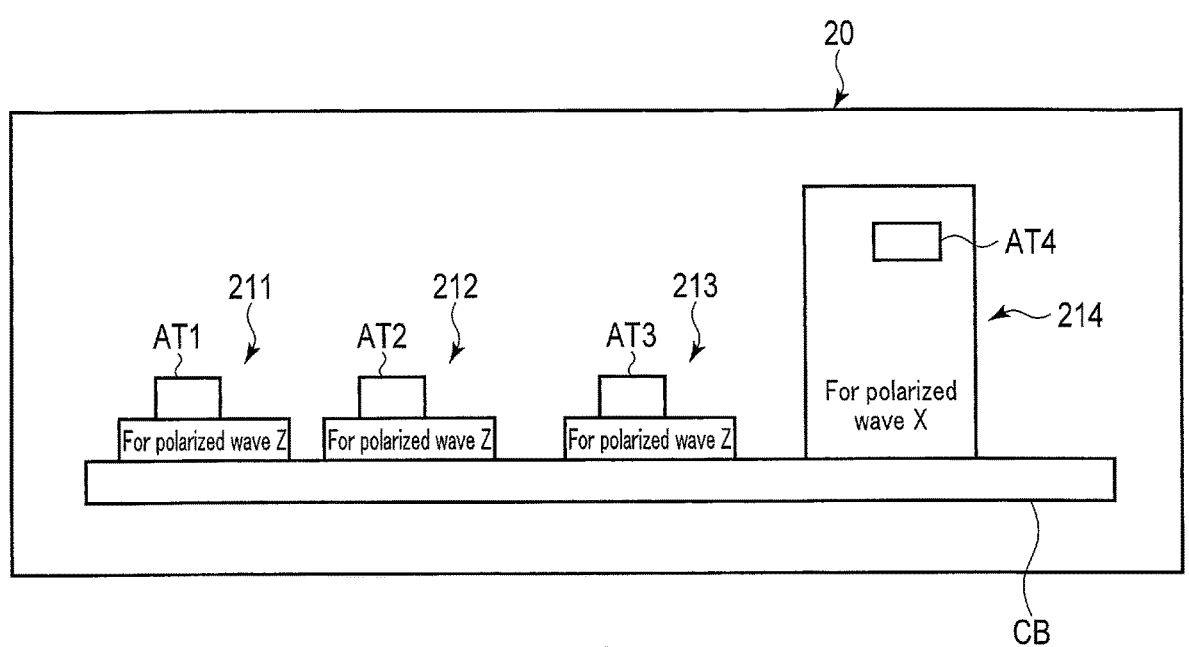
F I G. 4

STORAGE BATTERY APPARATUS

CROSS-REFERENCE TO RELATED APPLICATIONS

This is a Continuation Application of PCT Application No. PCT/JP2019/036398, filed Sep. 17, 2019, the entire contents of which are incorporated herein by reference.

FIELD

Embodiments described herein relate to a storage battery apparatus.

BACKGROUND

A storage battery apparatus obtained by combining a plurality of storage battery modules is used for various purposes. In recent years, for the purpose of simplifying a configuration of the storage battery apparatus, it has been studied to achieve wireless communication between a storage battery and a management apparatus using radio waves. A storage battery apparatus to be used outdoors or indoors may be stored in a metal chassis such as a board and a container. In a case where a radio wave is emitted from a communication circuit in closed space surrounded by a metal plate, the radio wave may be irregularly reflected and cause significant interference.

Generally, introduction of diversity is known as a measure for preventing radio wave interference as described above. In a case where diversity is applied to a storage battery apparatus, the storage battery module and a battery management circuit do not move in the chassis, and thus, it is effective to introduce polarization diversity.

However, there is a possibility that communication between the storage battery module and the battery management circuit (including communication equipment) may be generally concentrated on specific polarization, and arrangement of the communication equipment in regard to how many storage battery modules can be communicated in each of directions becomes a problem.

For example, if the communication equipment is arranged such that communication with all the storage battery modules may be equally concentrated on one polarization plane in each of all the directions of three axes orthogonal to one another in space, it is necessary to prepare simply three times the number of transmitters/receivers, which increases a complexity in the construction of the storage battery apparatus.

BRIEF DESCRIPTION OF THE DRAWINGS

FIG. 3 is a diagram schematically illustrating a configuration example of a battery management unit of the storage battery apparatus illustrated in FIG. 1.

FIG. 4 is a diagram for explaining a configuration example of first to fourth wireless transmission/reception modules of the battery management unit illustrated in FIG. 3.

DETAILED DESCRIPTION

According to one embodiment, a storage battery apparatus including: a plurality of storage battery modules each of which includes a battery module including a plurality of battery cells, a measurement circuit configured to measure voltages of the battery cells and a temperature of at least one portion of the battery module, a wireless transmission/reception module including an antenna configured to transmit and receive a radio wave having a polarization plane in any one of a first direction, a second direction, and a third direction orthogonal to one another in space, and an arithmetic processing apparatus configured to control operation of the measurement circuit and the wireless transmission/reception module; and a battery management unit which includes a first wireless transmission/reception module including an antenna configured to transmit and receive a radio wave having the polarization plane in the first direction, a second wireless transmission/reception module including an antenna configured to transmit and receive a radio wave having the polarization plane in the second direction, and an arithmetic processing apparatus configured to control operation of the first wireless transmission/reception module and the second wireless transmission/reception module, wherein the polarization plane in the first direction is less likely to have reception power of lowest receiving sensitivity than the polarization planes in other directions at the antenna in the battery management unit, and a number of the first wireless transmission/reception modules is larger than a number of the second wireless transmission/reception modules.

A configuration example of the storage battery apparatus according to an embodiment will be described in detail below with reference to the drawings.

Figure 1:
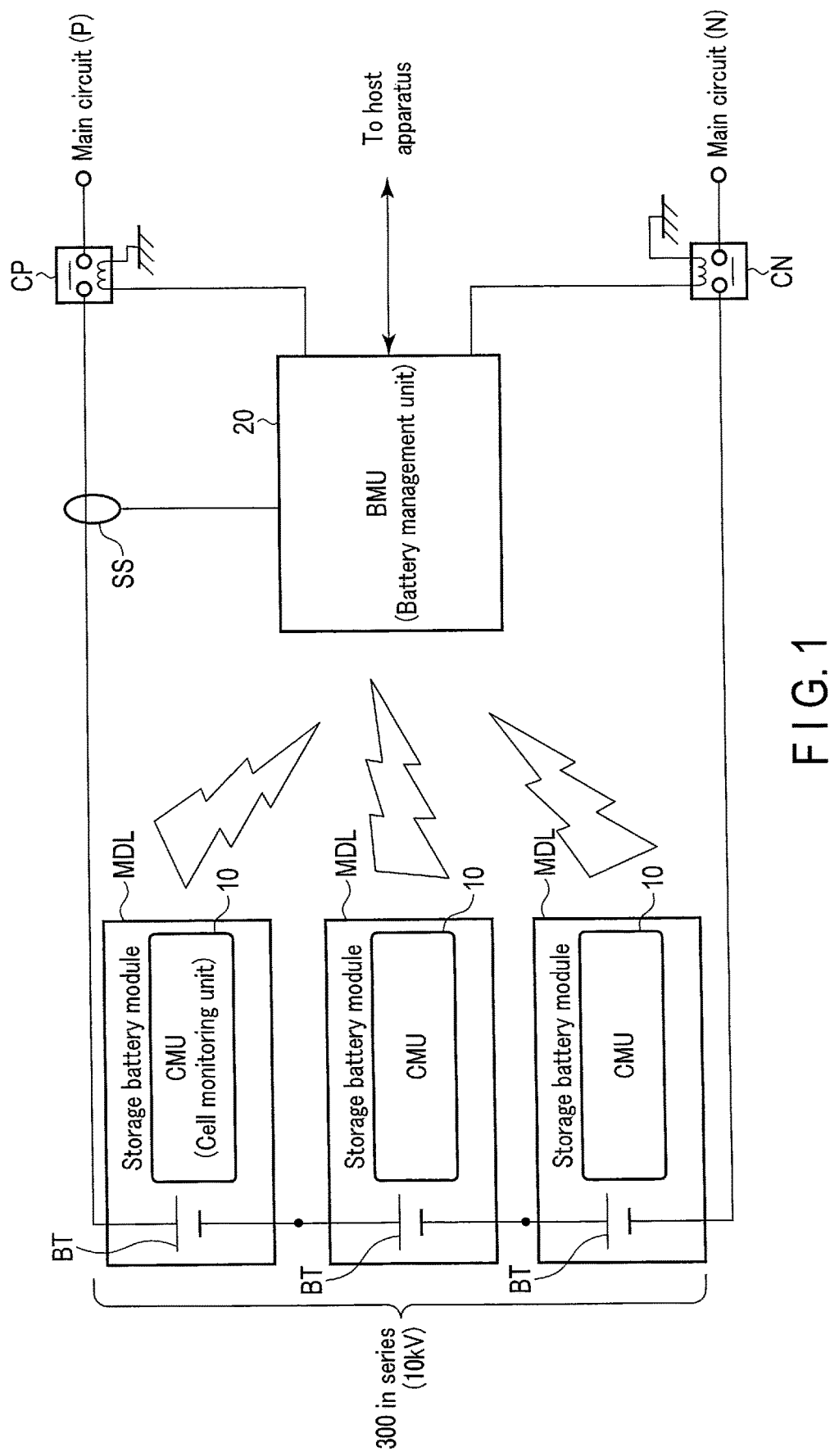
FIG. 1 is a diagram schematically illustrating a configuration example of a storage battery apparatus according to an embodiment.

FIG. 1 is a diagram schematically illustrating a configuration example of a storage battery apparatus according to an embodiment.

The storage battery apparatus of the present embodiment includes a plurality of storage battery modules MDL, a battery management unit (BMU) 20, a current sensor SS, a first contactor CP, and a second contactor CN.

The storage battery module MDL includes a battery module BT including a plurality of battery cells (illustrated in FIG. 2), and a cell monitoring unit (CMU) 10.

The battery module BT includes, for example, a plurality of battery cells of lithium ion batteries connected in series or in parallel.

The cell monitoring unit 10 includes a measurement circuit (illustrated in FIG. 2) which detects a voltage of each of the plurality of battery cells and a temperature of at least one portion of the battery module BT, an arithmetic processing apparatus (illustrated in FIG. 2), and a wireless transmission/reception module (illustrated in FIG. 2) capable of performing wireless communication with the battery management unit 20 using radio waves, and can periodically transmit a measurement value to the battery management unit 20.

In addition, the cell monitoring unit 10 equalizes the voltages (cell balance) of the plurality of battery cells based on a control signal received from the battery management unit 20.

The cell monitoring unit 10 may be configured with, for example, hardware, software, or a combination of hardware and software. The cell monitoring unit 10 is a circuit which includes, for example, at least one processor such as a CPU and an MPU, and a memory in which a program to be executed by the processor is recorded, and which realizes the above operation by software.

In the storage battery apparatus of the present embodiment, a total of 300 battery cells are connected in series by connecting the plurality of battery modules MDL in series, and a voltage between a main circuit on a high electric potential side and a main circuit on a low electric potential side at the time of full charge is set at 10 kV.

The current sensor SS detects a value of a current flowing through the main circuit on the high electric potential side, and supplies a detection value to the battery management unit 20.

The first contactor CP is interposed in a main circuit which connects a terminal on the highest electric potential side of the plurality of storage battery modules MDL and a positive electrode terminal, and can switch an electrical connection between the plurality of storage battery modules MDL and the positive electrode terminal. The contactor CP is controlled to open and close the contact by a control signal from the battery management unit 20.

The second contactor CN is interposed in a main circuit which connects a terminal on the lowest electric potential side of the plurality of storage battery modules MDL and a negative electrode terminal, and can switch an electrical connection between the plurality of storage battery modules MDL and the negative electrode terminal. The contactor CN is controlled to open and close the contact by a control signal from the battery management unit 20.

The battery management unit 20 can communicate with each of the plurality of cell monitoring units 10 and a host control circuit (not illustrated). In the storage battery apparatus of the present embodiment, the battery management unit 20 includes a communication circuit which is capable of performing wireless communication using radio waves with the plurality of cell monitoring units 10 and performing wired communication with the host control circuit.

The battery management unit 20 can receive various kinds of control signals from the host control circuit and can control operation of the plurality of cell monitoring units 10, the first contactor CP, and the second contactor CN based on the received information.

The battery management unit 20 periodically receives detection values of the voltages of the plurality of battery cells (or the battery modules BT) and a detection value of the temperature of the battery module BT from each of the plurality of cell monitoring units 10, and periodically receives a detection value of a current flowing through the plurality of battery modules BT from the current sensor SS. The battery management unit 20 can calculate a state of charge (SOC) and a state of health (SOH) of the battery module BT (or the battery cell) based on the received values. The SOC of the battery module BT is, for example, a ratio of current capacity [Ah] of the battery module BT to capacity [Ah] at full charge of the battery module BT (=(current capacity/capacity at full charge)×100). The SOH of the battery module BT is, for example, a ratio of current capacity [Ah] at full charge to an initial value [Ah] of capacity at full charge of the battery module BT (=(initial value of capacity at full charge/capacity at current full charge)×100).

The battery management unit 20 monitors voltages of the plurality of battery cells and the current flowing through the plurality of battery modules BT, and controls the cell monitoring units 10 so as to equalize the voltages of the plurality of battery cells. For example, the battery management unit 20 controls operation of a battery system so that the battery cell is not in an abnormal state such as over-charge and over-discharge.

The battery management unit 20 may be configured with hardware, software, or a combination of hardware and software. The battery management unit 20 may include, for example, at least one processor, and a memory in which a program to be executed by the processor is recorded.

Figure 2:
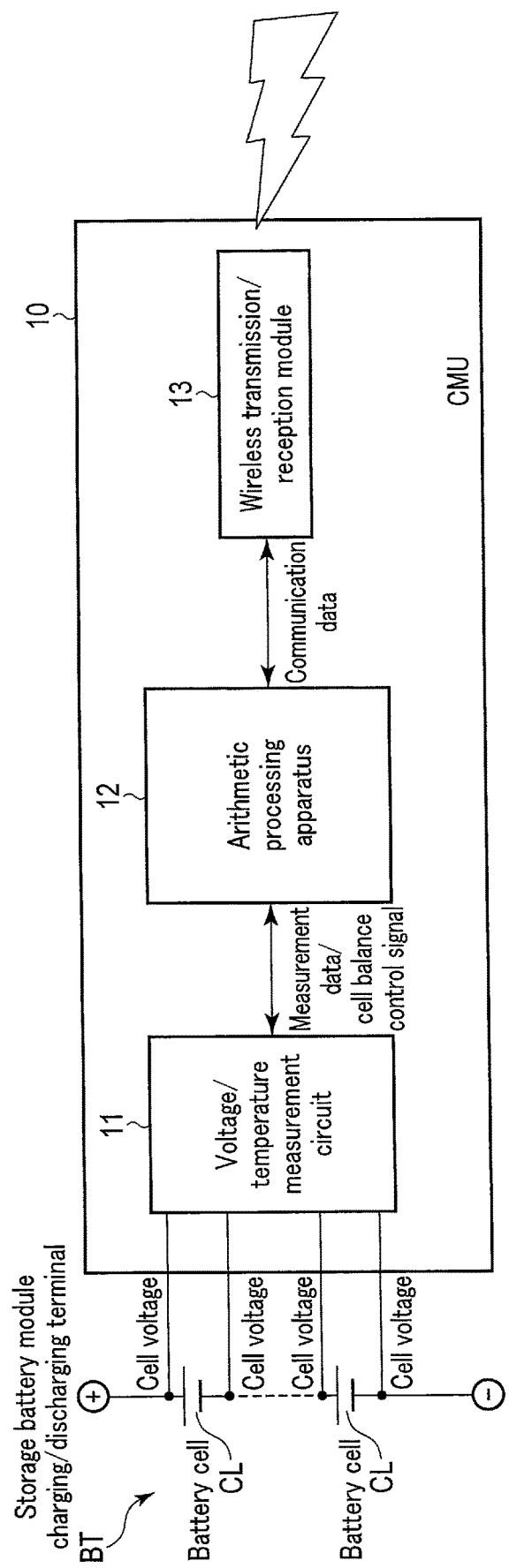
FIG. 2 is a diagram schematically illustrating a configuration example of a storage battery module of the storage battery apparatus illustrated in FIG. 1.

FIG. 2 is a diagram schematically illustrating a configuration example of a storage battery module of the storage battery apparatus illustrated in FIG. 1.

The storage battery module MDL includes a voltage/temperature measurement circuit 11, an arithmetic processing apparatus 12, and a wireless transmission/reception module 13.

The voltage/temperature measurement circuit 11 is electrically connected to a positive electrode terminal and a negative electrode terminal of each of the plurality of battery cells CL of the battery module BT, and can measure a value of a voltage of the positive electrode terminal and a value of a voltage of the negative electrode terminal of each of the plurality of battery cells CL.

In addition, the voltage/temperature measurement circuit 11 includes a temperature sensor (not illustrated), and can measure a value of a temperature at least one portion near the plurality of battery cells CL.

The voltage/temperature measurement circuit 11 periodically transmits the measurement value of the voltage and the measurement value of the temperature to the arithmetic processing apparatus 12.

The voltage/temperature measurement circuit 11 receives a cell balance control signal from the arithmetic processing apparatus 12. The voltage/temperature measurement circuit 11 includes a cell balance circuit (not illustrated). The cell balance circuit operates so as to equalize voltages of the plurality of battery cells CL (for example, to discharge a battery cell CL having a large voltage) in accordance with the received cell balance control signal.

The arithmetic processing apparatus 12 calculates a value of a voltage of each of the plurality of battery cells CL using the voltages of the positive electrode terminal and the negative electrode terminal received from the voltage/temperature measurement circuit 11. The arithmetic processing apparatus 12 transmits the value of the voltage of each of the plurality of battery cells CL and the value of the temperature received from the voltage/temperature measurement circuit 11 to the wireless transmission/reception module 13.

In addition, the arithmetic processing apparatus 12 transmits the cell balance control signal received from the battery management unit 20 via the wireless transmission/reception module 13 to the voltage/temperature measurement circuit 11 to cause the cell balance circuit to operate.

The wireless transmission/reception module 13 includes a transmitter/receiver which transmits and receives a radio wave including a polarization plane in a specific direction. The wireless transmission/reception module 13 can communicate with the battery management unit 20 using radio waves using a polarization diversity scheme.

FIG. 3 is a diagram schematically illustrating a configuration example of a battery management unit of the storage battery apparatus illustrated in FIG. 1.

The battery management unit 20 includes a first wireless transmission/reception module 211, a second wireless transmission/reception module 212, a third wireless transmission/reception module 213, a fourth wireless transmission/reception module 214, an arithmetic processing apparatus 22, an A/D conversion circuit 23, a first contactor drive circuit 24P, a second contactor drive circuit 24M, and a communication interface 25.

The A/D conversion circuit 23 converts a current value (or a current equivalent value) of an analog signal received from the current sensor SS into a current value (or a current equivalent value) of a digital signal and transmits the current value to the arithmetic processing apparatus 22.

The first contactor drive circuit 24P opens and closes a contact of the first contactor CP in accordance with the control signal received from the arithmetic processing apparatus 22.

The second contactor drive circuit 24M opens and closes a contact of the second contactor CN in accordance with the control signal received from the arithmetic processing apparatus 22.

The communication interface 25 is interposed between the arithmetic processing apparatus 22 and a host apparatus (not illustrated). The communication interface 25 is electrically connected to the host apparatus through a communication line, and is configured to enable transmission and reception of communication data between the arithmetic processing apparatus 22 and the host apparatus according to predetermined communication protocol.

The arithmetic processing apparatus 22 can calculate, for example, a state of charge (SOC) and a state of health (SOH) of the battery module BT by using voltage values and temperature values (alternatively, voltage equivalent values and temperature equivalent values) received from the plurality of storage battery modules MDL via the first to the fourth wireless transmission/reception modules 211 to 214 and the current value (or a current equivalent value) received from the A/D conversion circuit 23.

For example, the arithmetic processing apparatus 22 can periodically transmit the SOC and the SOH of the battery module BT to the host apparatus and notify the host apparatus of permission and stop of charging and discharging of the battery module BT.

In addition, the arithmetic processing apparatus 22 transmits a control signal to the first contactor driving circuit 24P and the second contactor drive circuit 24M based on the communication data received from the host apparatus.

In the storage battery apparatus of the present embodiment, the battery management unit 20 includes a plurality of wireless transmission/reception modules 211 to 214 installed so as to be able to transmit and receive a plurality of radio waves having polarization planes in mutually different directions while setting antenna orientation in a plurality of directions. The battery management unit 20 includes more wireless transmission/reception modules which transmit and receive radio waves using a polarization plane in a specific direction than wireless transmission/reception modules which transmit and receive radio waves using other polarization planes.

FIG. 4 is a diagram for explaining a configuration example of first to fourth wireless transmission/reception modules of the battery management unit illustrated in FIG. 3.

The battery management unit 20 includes a circuit board CB on which the first to the fourth wireless transmission/reception modules 211 to 214 are disposed.

The first wireless transmission/reception module 211 is a transmitter/receiver which includes an antenna AT1 installed to transmit and receive a radio wave by a polarization plane in a specific direction (for example, a Z direction) and transmits and receives a radio wave having a polarization plane in the specific direction. The first wireless transmission/reception module 211 can communicate with the cell monitoring units 10 of the plurality of storage battery modules MDL using radio waves using the polarization diversity scheme.

The second wireless transmission/reception module 212 is a transmitter/receiver which includes an antenna AT2 installed to transmit and receive a radio wave by a polarization plane in a specific direction (for example, a Z direction) and transmits and receives a radio wave having a polarization plane in the specific direction. The second wireless transmission/reception module 212 can communicate with the cell monitoring units 10 of the plurality of storage battery modules MDL using radio waves using the polarization diversity scheme.

The third wireless transmission/reception module 213 is a transmitter/receiver which includes an antenna AT3 installed to transmit and receive a radio wave by a polarization plane in a specific direction (for example, a Z direction) and transmits and receives a radio wave having a polarization plane in the specific direction. The third wireless transmission/reception module 213 can communicate with the cell monitoring units 10 of the plurality of storage battery modules MDL using radio waves using the polarization diversity scheme.

The fourth wireless transmission/reception module 214 is a transmitter/receiver which includes an antenna AT4 installed to transmit and receive a radio wave by a polarization plane in another specific direction different from the first to third wireless transmission/reception modules 211 to 213 (for example, an X direction) and transmits and receives a radio wave having a polarization plane in the above-described other specific direction. The fourth wireless transmission/reception module 214 can communicate with the cell monitoring units 10 of the plurality of storage battery modules MDL using radio waves using the polarization diversity scheme.

Note that the X direction, the Z direction, and the Y direction (first to third directions) are directions orthogonal to one another in space. In the present embodiment, for example, when each of the plurality of storage battery modules MDL emits a radio wave having a specific polarization plane (polarization plane in the Z direction) in a state where the storage battery apparatus is installed, the Z direction is a direction of the polarization plane in which reception power [dBm] becomes the largest at the antenna of the battery management unit 20 (a probability of the reception power having the lowest receiving sensitivity becomes smaller than in the other directions). Note that a polarization plane advantageous for transmission and reception (having the largest reception power) can be set in advance by simulations or experiments.

Next, an example of results of simulations of communication using radio waves between the battery management unit 20 of the storage battery apparatus of the present embodiment and the plurality of storage battery modules MDL will be described.

Figure 5:
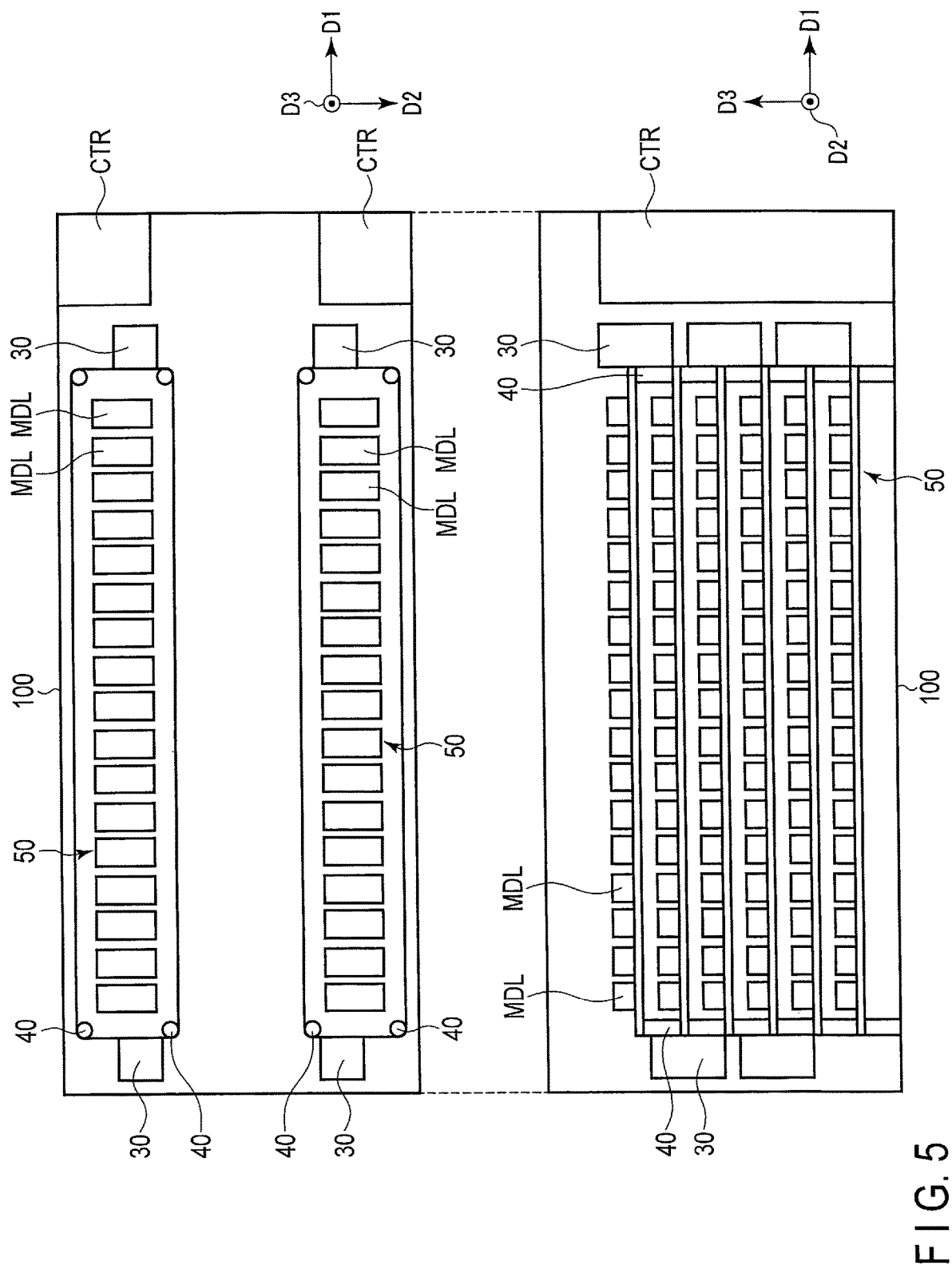
FIG. 5 is a diagram schematically illustrating a configuration example of a storage battery apparatus for which simulation of communication using radio waves is performed.

FIG. 5 is a diagram schematically illustrating a configuration example of a storage battery apparatus for which simulation of communication using radio waves is performed.

FIG. 5 illustrates a top view and a side view of a model obtained by simulating a storage battery apparatus including a metal container 100 as a chassis. Note that an upper plate of the container 100 in the top view and one side plate of the container 100 in the side view are omitted.

The storage battery apparatus illustrated in FIG. 5 includes a container 100, a control apparatus CTR, a plurality of storage battery modules MDL, a disconnector 30, and a shelf 50. The shelf 50 includes a plurality of insulating columns 40 and a plurality of shelf plates.

The container 100 includes a floor plate, an upper plate, and a plurality of side plates which surrounds substantially rectangular parallelepiped space. The container 100 is disposed such that a surface on which the storage battery apparatus is installed is substantially parallel to the floor plate.

The floor plate, the upper plate, and the side plates of the container 100 are substantially rectangular metal plates. The floor plate and the upper plate are arranged to face each other. The floor plate is a support member which supports equipment stored in the container 100. A pair of side plates faces each other in a part between the floor plate and the upper plate, and is disposed so as to be orthogonal to the other pair of side plates.

In space inside the container 100, two shelves 50, two controller boards CTR, and a plurality of storage battery modules MDL are stored. The two shelves 50 are disposed on the floor plate of the container 100 at intervals from each other in a transverse direction D2 of the floor plate. The shelf 50 is arranged side by side with the controller board CTR in a longitudinal direction D1 of the floor plate of the container 100.

Each of the plurality of shelf plates of the shelf 50 has a substantially rectangular shape. Each of the plurality of shelf plates may include a conductive member such as a wiring electrically connected to the battery module BT of the storage battery module MDL supported by the shelf plate. The plurality of shelf plates are supported by the insulating columns 40 in the vicinity of four corners, and are positioned in a state where the shelf plates are spaced apart from each other at predetermined intervals.

The plurality of storage battery modules MDL are arranged side by side on the shelf plate along the longitudinal direction D1 of the floor plate. In the plurality of storage battery modules MDL stored in one shelf 50, the battery modules BT can be connected in series or in parallel via the conductive member of the shelf plate and the disconnector 30.

For example, the disconnector 30 is configured to be able to cut off electrical connection between the plurality of storage battery modules MDL arranged on adjacent shelf plates. For example, in a case where maintenance work is performed or in a case where work of replacing the storage battery module MDL is performed due to a failure or deterioration, the electrical connection between the storage battery module MDL and a main circuit can be cut off by the disconnector 30.

The controller board CTR includes the battery management unit 20 which communicates with a plurality of storage battery modules MDL to be controlled. For example, the battery management unit 20 controls the plurality of storage battery modules MDL stored in the shelves 50 arranged side by side in the direction D1.

Figure 6:
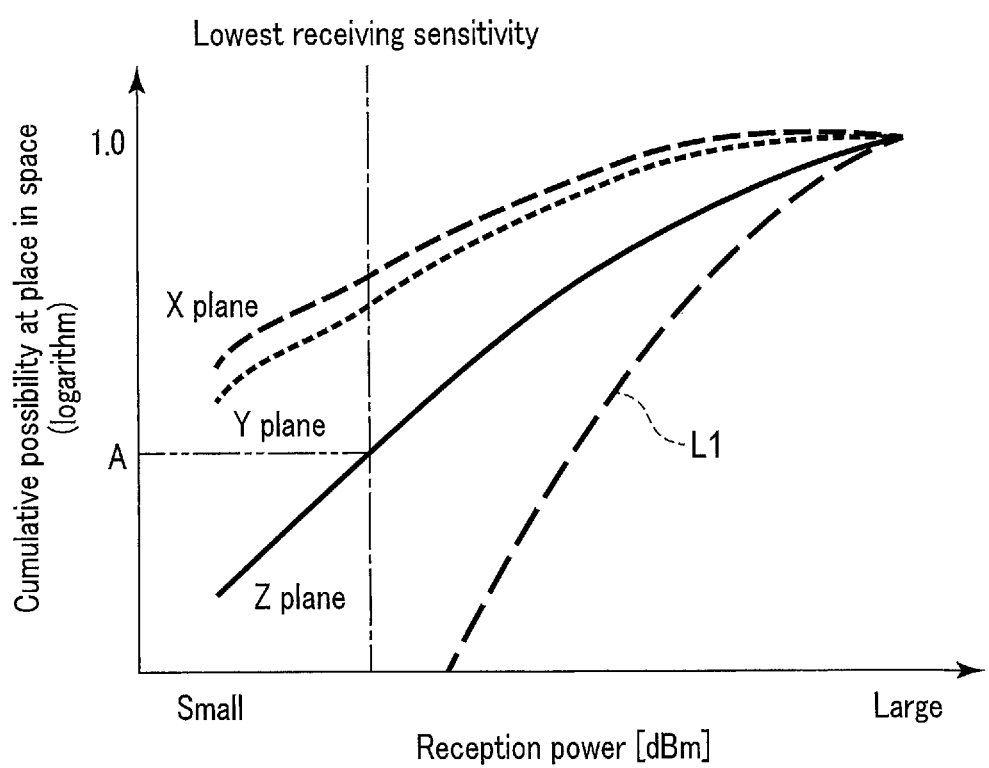
FIG. 6 is a diagram illustrating an example of a result of simulation of communication using radio waves between the battery management unit and a plurality of storage battery modules for a model of the storage battery apparatus illustrated in FIG. 5.

FIG. 6 is a diagram illustrating an example of a result of simulation of communication using radio waves between the battery management unit and a plurality of storage battery modules for a model of the storage battery apparatus illustrated in FIG. 5.

Here, an example of a cumulative possibility of reception power for each polarization plane and reception power in a case where the two polarization planes are combined in the battery management unit 20 when the radio wave (polarization in the Z direction) having the polarization plane in the Z direction is emitted from the plurality of storage battery modules MDL is illustrated. In addition, a graph L1 illustrated in FIG. 6 illustrates an example of relationship between reception power and a cumulative possibility thereof for larger power between a radio wave having the polarization plane in the Z direction and a radio wave having the polarization plane in the X direction (polarization in the X direction) or larger power between a radio wave having the polarization plane in the Z direction and a radio wave having the polarization plane in the Y direction (polarization in the Y direction).

At the reception power having the lowest receiving sensitivity of the battery management unit 20, the cumulative possibility of the polarized wave in the Z direction is the lowest, and a probability that the polarized wave in the Z direction cannot be received was A. Thus, a probability that the polarized wave in the Z direction can be received is 1-A. This is considered to be because in a case where a radio wave is emitted to closed space surrounded by a metal chassis, the radio wave is reflected by the chassis, and rarely, a storage battery module MDL for which communication is not established only with a specific polarized wave appears.

On the other hand, in a case where the larger power of the polarized wave in the Z direction and the polarized wave in the X direction is received, or in a case where the larger power of the polarized wave in the Z direction and the polarized wave in the Y direction is received, a probability that the battery management unit 20 cannot receive the radio wave was substantially 0.

Next, an example of results of simulations performed for a model of a storage battery apparatus configured as a battery board including a metal chassis will be described.

Figure 7:
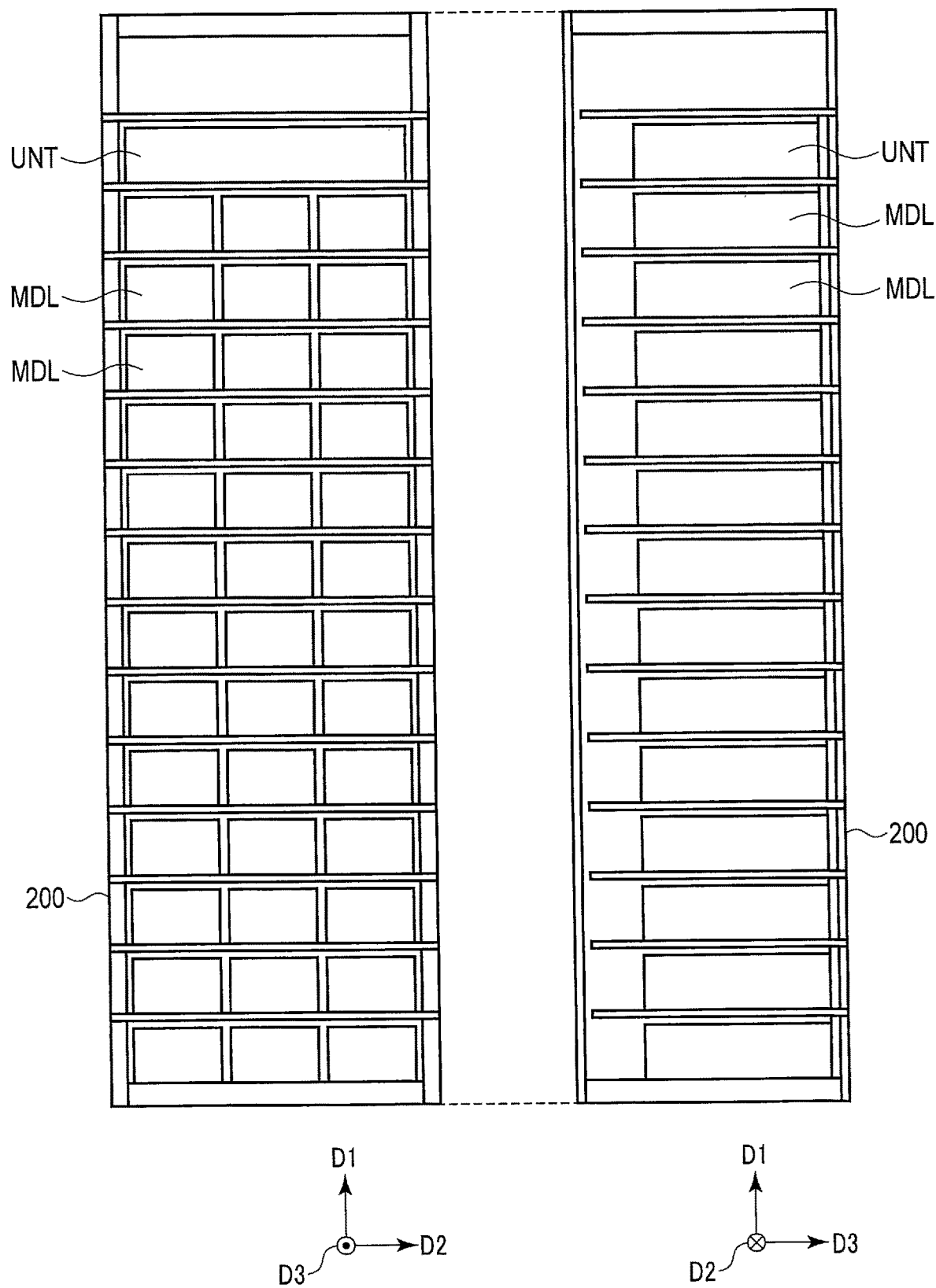
FIG. 7 is a diagram schematically illustrating another configuration example of a storage battery apparatus for which simulation of communication using radio waves is performed.

FIG. 7 is a diagram schematically illustrating another configuration example of a storage battery apparatus for which simulation of communication using radio waves is performed. FIG. 7 illustrates a side view of the storage battery apparatus when viewed from two different directions.

The storage battery apparatus includes a chassis 200, a control unit UNT, and a plurality of storage battery modules MDL.

The chassis 200 includes a bottom plate, an upper plate, four side plates disposed between the bottom plate and the upper plate, and a plurality of partition plates. The bottom plate, the upper plate, and the side plate are made of a metal material. The plurality of partition plates are arranged so as to be substantially parallel to the bottom plate and the upper plate, and are positioned at intervals so as to partition a space surrounded by the bottom plate, the upper plate, and the side plates into a plurality of spaces.

The plurality of storage battery modules MDL are stored side by side in each space partitioned by the partition plates of the chassis 200. In this example, the storage battery modules MDL include chassis having a substantially rectangular parallelepiped shape, and are arranged side by side in a width direction D2 such that, for example, a longitudinal direction of the chassis becomes a depth direction D3. In the space in the chassis 200 partitioned by the partition plates, a dimension in a height direction D1 is substantially equal to a dimension in a height direction D1 of the chassis of the storage battery module MDL. Thus, the partition plates of the chassis 200 are interposed between the storage battery modules MDL arranged in the height direction D1. The battery modules BT of the plurality of storage battery modules MDL can be electrically connected by, for example, a conductive member such as a wiring disposed in spaces between the storage battery modules MDL and the side plates of the chassis 200.

The control unit UNT is disposed at the uppermost portion (an end portion on the upper plate side in the height direction D1) of the spaces partitioned by the partition plates. The control unit UNT includes the battery management unit 20. The battery management unit 20 controls the plurality of storage battery modules MDL stored in the chassis 200.

Figure 8:
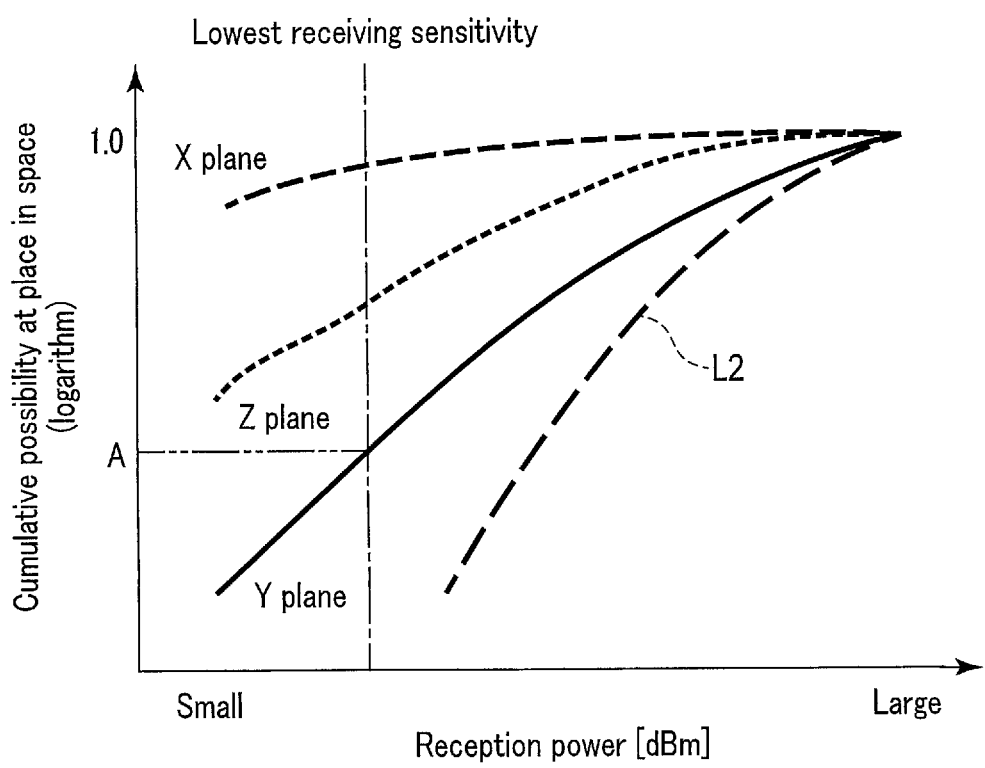
FIG. 8 is a diagram illustrating an example of a result of simulation of communication using radio waves between the battery management unit and a plurality of storage battery modules for a model of the storage battery apparatus illustrated in FIG. 7.

FIG. 8 is a diagram illustrating an example of a result of simulation of communication using radio waves between the battery management unit and a plurality of storage battery modules for a model of the storage battery apparatus illustrated in FIG. 7.

Here, an example of a cumulative possibility of reception power for each polarization plane and reception power in a case where the two polarization planes are combined in the battery management unit 20 when the polarized wave in the Z direction is emitted from the plurality of storage battery modules MDL is illustrated. In addition, a graph L2 illustrated in FIG. 8 illustrates an example of relationship between reception power and a cumulative possibility thereof for larger power between the polarized wave in the Z direction and the polarized wave in the X direction or larger power between the polarized wave in the Z direction and the polarized radio in the Y direction.

Concerning reception power having the lowest receiving sensitivity of the battery management unit 20, a cumulative possibility of the polarized wave in the y direction is the lowest, and a probability that the battery management unit 20 cannot receive the polarized wave in the y direction was A. Thus, a probability that the battery management unit 20 can receive the polarized wave in the y direction is 1-A.

On the other hand, in a case where the larger power of the polarized wave in the Z direction and the polarized wave in the X direction is received, or in a case where the larger power of the polarized wave in the Z direction and the polarized wave in the Y direction is received, a probability that the battery management unit 20 cannot receive the radio wave was substantially 0.

According to a simulation by a finite-difference time-domain (FDTD) method, the probability A was a numerical value on the order of $1 \times 10^{-4}$ in the storage battery apparatus of the container model and the board model described above. Thus, the number of wireless transmission/reception modules capable of transmitting and receiving radio waves having the polarization plane (the polarization plane in the X direction or the polarization plane in the Y direction) that is not the polarization plane (the polarization plane in the Z direction) mainly having high receiving sensitivity only requires to be the number (one in a case where the number is smaller than 1) of values obtained by dividing the number of storage battery modules MDL to be controlled by 10,000 (multiplied by $1 \times 10^{-4}$).

In consideration of the difference in conditions between an environment where the storage battery apparatus is actually installed and the simulation, the number of wireless transmission/reception modules capable of transmitting and receiving radio waves having the polarization plane (the polarization plane in the X direction or the polarization plane in the Y direction) that is not the polarization plane (the polarization plane in the Z direction) mainly having high receiving sensitivity only requires to be the number (one in a case where the number is smaller than 1) of values obtained by dividing the number of storage battery modules MDL to be controlled by 1,000.

On the other hand, the number of wireless transmission/reception modules capable of transmitting and receiving radio waves having the polarization plane mainly having high receiving sensitivity (polarization plane in the Z direction) needs to be as many as almost the same number of storage battery modules MDL to be controlled. Here, in a case where one wireless transmission/reception module is connectable (communicable) to one storage battery module MDL, the number of wireless transmission/reception modules becomes the same as the number of storage battery modules MDL.

From the above, for example, as illustrated in FIG. 1, the battery management unit 20 which is to control the three storage battery modules MDL only requires to include at least three wireless transmission/reception modules capable of transmitting and receiving radio waves by a polarization plane (polarization plane in the Z direction) mainly having high receiving sensitivity, and one wireless transmission/reception module capable of transmitting and receiving radio waves by a polarization plane (polarization plane in the X direction or polarization plane in the Y direction) that is not the polarization plane (polarization plane in the Z direction) mainly having high receiving sensitivity.

In this event, in order to improve reliability of communication using radio waves, the battery management unit 20 may include, for example, one wireless transmission/reception module capable of transmitting and receiving a polarized wave in the X direction and one wireless transmission/reception module capable of transmitting and receiving a polarized wave in the Y direction. The battery management unit 20 can receive polarized waves in a plurality of directions other than the polarization plane having high receiving sensitivity, so that it is possible to further improve reliability of communication using radio waves.

Note that the polarization plane advantageous for transmission and reception using radio waves can be confirmed in advance by simulations, or the like. It is therefore not necessary to dispose the wireless transmission/reception modules so as to allow concentration of communication with all the storage battery modules on the polarization plane for each of all the three axes (X-axis, Y-axis, and Z-axis) in the space, so that it is possible to reduce the number of wireless transmission/reception modules necessary for performing communication with high reliability in the storage battery apparatus.

Next, an example of operation of the battery management unit in a case where communication with the plurality of storage battery modules MDL using radio waves is started in the storage battery apparatus of the present embodiment will be described.

Figure 9:
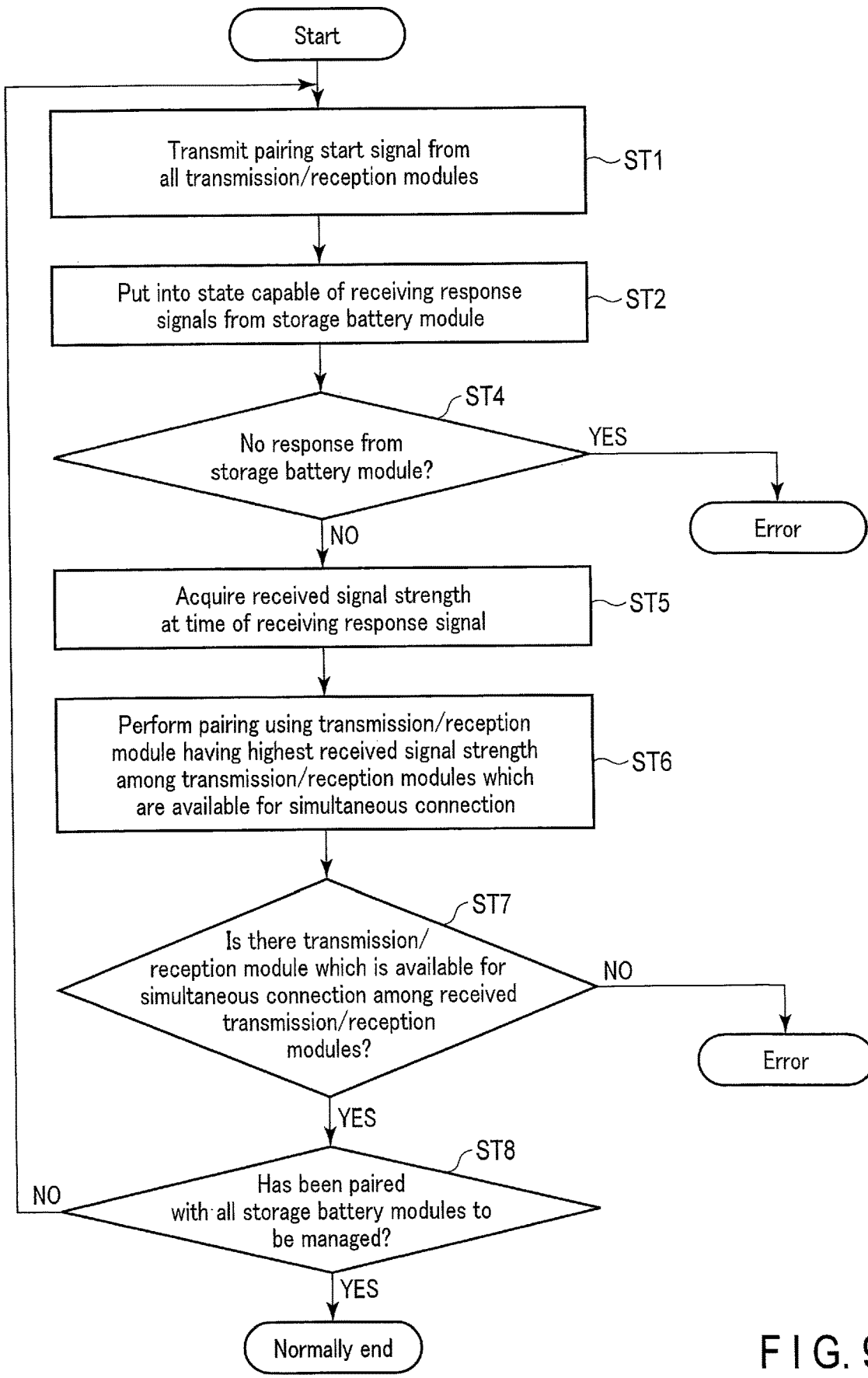
FIG. 9 is a flowchart for explaining an example of operation of a battery management unit in the storage battery apparatus according to the embodiment.

FIG. 9 is a flowchart for explaining an example of operation of a battery management unit in the storage battery apparatus according to the embodiment.

Here, the battery management unit 20 sequentially performs pairing with the plurality of storage battery modules MDL. First, the arithmetic processing apparatus 22 of the battery management unit 20 causes all the wireless transmission/reception modules 211 to 214 to transmit a pairing start signal to a predetermined unpaired storage battery module MDL (step ST1). In other words, the first to the third wireless transmission/reception modules 211 to 213 transmit polarized waves in the Z direction, and the fourth wireless transmission/reception module 214 transmits polarized waves in the X direction.

Subsequently, the arithmetic processing apparatus 22 puts all the wireless transmission/reception modules 211 to 214 in a state capable of receiving response signals from the predetermined storage battery module MDL (step ST2).

In a case where there is no response from the predetermined storage battery module MDL for a predetermined period (step ST4), the arithmetic processing apparatus 22 determines that there is an error and ends the pairing. In this event, the arithmetic processing apparatus 22 may notify the host apparatus of a communication error.

In a case where a response signal is received from the predetermined storage battery module MDL (step ST4), the arithmetic processing apparatus 22 acquires received signal strength at the time of receiving the response signal at the wireless transmission/reception modules 211 to 214 (step ST5).

The arithmetic processing apparatus 22 allocates a wireless transmission/reception module having the highest received signal strength at the time of receiving the response signal to a predetermined storage battery module MDL (step ST6).

Here, the arithmetic processing apparatus 22 determines whether or not there is a wireless transmission/reception module which has an antenna capable of receiving a polarized wave having the highest received signal strength at the time of receiving a response signal and which is available for simultaneous connection among the wireless transmission/reception modules 211 to 214 (step ST7).

In step ST7, in a case where there is a wireless transmission/reception module that satisfies the condition, the arithmetic processing apparatus 22 allocates the wireless transmission/reception module that satisfies the condition to the predetermined storage battery module MDL and performs pairing.

In step ST7, in a case where there is no wireless transmission/reception module that satisfies the condition, the arithmetic processing apparatus 22 determines that there is an error and ends the pairing. In this event, the arithmetic processing apparatus 22 may notify the host apparatus of a communication error.

The arithmetic processing apparatus 22 determines whether or not all the storage battery modules MDL to be controlled have been paired (step ST8). In a case where there is a control target storage battery module MDL that has not been paired yet, the arithmetic processing apparatus 22 returns to step ST1 and continues pairing. In a case where the pairing with all the storage battery modules MDL is completed, the arithmetic processing apparatus 22 normally ends the pairing.

According to the simulation results described above, a probability that a radio wave cannot be received through transmission and reception of the radio wave at the battery management unit 20 using a polarization plane mainly having high receiving sensitivity and other polarization planes in combination with each other is substantially 0. Thus, in a case where the storage battery apparatus is operating normally, pairing with all the storage battery modules MDL can be performed by pairing the wireless transmission/reception modules 211 to 214 of the battery management unit 20 and all the storage battery modules MDL as described above.

As described above, the storage battery apparatus of the present embodiment does not need to include a large number of wireless transmission/reception modules, so that it is possible to simplify the configuration of the storage battery apparatus which performs communication using radio waves.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage battery apparatus comprising; a plurality of storage battery modules each of which includes: a battery module including a plurality of battery cells,
a measurement circuit configured to measure voltages of the battery cells and a temperature of at least one portion of the battery module,
a wireless transmission/reception module including an antenna configured to transmit and receive a radio wave having a polarization plane in any one of a first direction, a second direction, and a third direction orthogonal to one another in space, and
an arithmetic processing apparatus configured to control operation of the measurement circuit and the wireless transmission/reception module; and
a battery management unit which includes: a plurality of first wireless transmission/reception modules including an antenna configured to transmit and receive a radio wave having the polarization plane in the first direction, one or more second wireless transmission/reception modules including an antenna configured to transmit and receive a radio wave having the polarization plane in the second direction, and
an arithmetic processing apparatus configured to control operation of the plurality of the first wireless transmission/reception module and the one or more second wireless transmission/reception module; wherein, when each of the storage battery modules emits a radio wave having a specific polarization plane in a state where the storage battery apparatus is installed, the first direction is a direction of a polarization plane in which reception power becomes largest at the antenna in the battery management unit, the number of the plurality of the first wireless transmission/reception modules included in the battery management unit is an equal number to the plurality of storage battery modules to be controlled by the battery management unit, a number of the one or more second wireless transmission/reception modules included in the battery management unit is equal to or larger than the number of a value obtained by dividing the number of the storage battery modules by 10,000 and is equal to or larger than one in a case where the value is smaller than 1, and the first direction, the second direction, and the third direction are directions orthogonal to one another in space.

2. The storage battery apparatus according to claim 1, wherein the battery management unit includes the plurality of the first wireless transmission/reception modules of a number to perform transmission and reception to and from all of the storage battery modules.

3. The storage battery apparatus according to The storage battery apparatus according to wherein the battery management unit includes one or more third wireless transmission/reception modules including an antenna configured to transmit and receive a radio wave having the polarization plane in the third direction, and the number of the plurality of the first wireless transmission/reception modules is larger than a number of the one or more third wireless transmission/reception modules, and the number of the third wireless transmission/reception modules is equal to or larger than the number of the second wireless transmission/reception modules.

4. The storage battery apparatus according to claim 1, further comprising a metal chassis in which the plurality of storage battery modules and the battery management unit are stored.

* * * * *